US012783583B2

(12) United States Patent
Tian

(10) Patent No.: US 12,783,583 B2
(45) Date of Patent: Nov. 3, 2026

(54) SEARCH TERM RECOMMENDATION METHOD AND COMPUTER DEVICE, AND STORAGE MEDIUM

(71) Applicant: Beijing Zitiao Network Technology Co., Ltd., Beijing (CN)

(72) Inventor: Xinyi Tian, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/741,911

(22) Filed: Jun. 13, 2024

(65) Prior Publication Data

US 2025/0036686 A1 Jan. 30, 2025

(30) Foreign Application Priority Data

Jul. 27, 2023 (CN) ........................ 202310934448.X

(51) Int. Cl.
*G06F 16/9032* (2019.01)

(52) U.S. Cl.
CPC .............................. *G06F 16/90324* (2019.01)

(58) Field of Classification Search
None
See application file for complete search history.

(56) References Cited

U.S. PATENT DOCUMENTS

2015/0161212 A1* 6/2015 Yang .................. G06F 16/9535 707/722
2015/0199412 A1* 7/2015 Chan .................. G06F 16/9038 707/722
2015/0317319 A1* 11/2015 Andress .............. G06F 16/3322 707/722
2016/0092563 A1* 3/2016 Luo ....................... G06F 3/0488 707/722
2016/0132198 A1* 5/2016 Sinclair .................. G06Q 50/01 715/739

(Continued)

FOREIGN PATENT DOCUMENTS

CN 104991962 A 9/2015
CN 111444356 A 7/2020

(Continued)

OTHER PUBLICATIONS

Office action received from Chinese patent application No. 202310934448.X mailed on Aug. 23, 2025, 18 pages (5 pages English Translation and 13 pages Original Copy).

*Primary Examiner* — Giuseppi Giuliani

(57) ABSTRACT

The present disclosure provides a search term recommendation method and apparatus, a computer device, and a storage medium. The method includes: displaying a plurality of first search term cards, where the first search term card includes a search keyword and result summary information in at least one corresponding information dimension; and in response to a trigger operation for any one of the first search term cards, updating the first search term card to a second search term card, where search result preview information is displayed in the second search term card; the search result preview information is related to at least one of a natural search result and a generative search result; and the search result preview information is used for display of a search result details page corresponding to the search keyword after the search result preview information is triggered.

19 Claims, 7 Drawing Sheets

(56) References Cited

U.S. PATENT DOCUMENTS

| | | | | |
|---|---|---|---|---|
| 2017/0126686 | A1* | 5/2017 | Totov | H04L 63/105 |
| 2024/0095272 | A1* | 3/2024 | Lin | G06F 16/435 |
| 2025/0005083 | A1* | 1/2025 | Chaudhuri | G06F 16/9532 |

FOREIGN PATENT DOCUMENTS

| | | | |
|---|---|---|---|
| CN | 113779408 | A | 12/2021 |
| CN | 104899305 | A | 9/2025 |
| KR | 10-2022-0068819 | A | 5/2022 |

* cited by examiner

SEARCH TERM RECOMMENDATION METHOD AND COMPUTER DEVICE, AND STORAGE MEDIUM

CROSS-REFERENCE TO RELATED APPLICATION

The present application claims priority of the Chinese Patent Application No. 202310934448.X, filed on Jul. 27, 2023, the disclosure of which is incorporated herein by reference in the present application.

TECHNICAL FIELD

The present disclosure relates to the field of computer technologies, and in particular, to a search term recommendation method and apparatus, a computer device, and a storage medium.

BACKGROUND

With rapid development of Internet technologies, users can obtain various required information on a variety of information pages. For example, the users can obtain various recommended information on an information recommendation page, and initiate a search on an information search page to obtain search result information on a search results page. Moreover, to enhance the user experience, a variety of search terms may often be recommended and displayed on the information pages, and the users can obtain search result information related to a search term by triggering the search term.

However, with current search term recommendation methods, search results often do not meet search demands, which affects the search experience of users, and lengthens the information search path, thereby reducing the efficiency of access to effective information.

SUMMARY

Embodiments of the present disclosure provide at least a search term recommendation method and apparatus, a computer device, and a storage medium.

According to a first aspect, an embodiment of the present disclosure provides a search term recommendation method. The method includes:

- displaying a plurality of first search term cards, where the first search term card includes a search keyword and result summary information in at least one corresponding information dimension; and
- in response to a trigger operation for any one of the first search term cards, updating the first search term card to a second search term card, where search result preview information is displayed in the second search term card; the search result preview information is related to at least one of a natural search result and a generative search result; and
- the search result preview information is used for display of a search result details page corresponding to the search keyword after the search result preview information is triggered.

In a possible implementation, the updating the first search term card to a second search term card includes:

- replacing the first search term card with the second search term card.

In a possible implementation, the updating the first search term card to a second search term card includes:

- adjusting a card size of the first search term card based on a display size required for the search result preview information, and displaying the search result preview information in the adjusted first search term card to obtain the second search term card.

In a possible implementation, the plurality of first search term cards are in a multi-column display style; and

- the information dimension corresponding to the first search term card is related to a semantic feature corresponding to the search keyword, and the information dimension includes at least one of a picture, a video, a text description, and preview indication information.

In a possible implementation, the search result preview information is determined by:

- obtaining, using a search engine, a natural search result matching the search keyword; and
- determining the search result preview information based on the natural search result if a matching degree between the natural search result and the search keyword meets a preset matching degree.

In a possible implementation, the search result preview information is determined by:

- obtaining, in response to the search keyword being of a question-answer type, a plurality of natural search results matching the search keyword; and
- performing result aggregation on the plurality of natural search results to obtain the search result preview information, where the search result preview information includes answer information extracted from the plurality of natural search results.

In a possible implementation, the search result preview information is determined by:

- in response to the search keyword being of a multi-answer dimension type, obtaining, from a plurality of preset information databases, dimensional information corresponding to the search keyword in each of a plurality of answer dimensions related to the search keyword; and
- performing structured processing on pieces of dimensional information in the answer dimensions to obtain the search result preview information.

In a possible implementation, the search result preview information is determined by:

- generating, using an artificial intelligence model, the search result preview information matching the search keyword.

In a possible implementation, the display of the search result details page corresponding to the search keyword includes:

- displaying, on the search result details page, a target search result corresponding to the search result preview information along with additional search results matching the search keyword, where the target search result includes at least one of the natural search result and the generative search result.

In a possible implementation, after the search result details page corresponding to the search keyword is displayed, the method further includes:

- displaying a plurality of third search term cards in a search term recommendation area of the search result details page, where the third search term card includes recommended search terms related to the search keyword, and result summary information for the recommended search terms in at least one corresponding information dimension.

According to a second aspect, an embodiment of the present disclosure further provides a search term recommendation apparatus. The apparatus includes:

a first display module configured to display a plurality of first search term cards, where the first search term card includes a search keyword and result summary information in at least one corresponding information dimension; and a second display module configured to, in response to a trigger operation for any one of the first search term cards, update the first search term card to a second search term card, where search result preview information is displayed in the second search term card; the search result preview information is related to at least one of a natural search result and a generative search result; and the search result preview information is used for display of a search result details page corresponding to the search keyword after the search result preview information is triggered.

According to a third aspect, an optional implementation of the present disclosure further provides a computer device including a processor and a memory, where the memory stores machine-readable instructions executable by the processor, the processor is configured to execute the machine-readable instructions stored in the memory, and the machine-readable instructions, when executed by the processor, cause the steps in the first aspect described above or any one of possible implementations of the first aspect to be performed.

According to a fourth aspect, an optional implementation of the present disclosure further provides a computer-readable storage medium having stored thereon a computer program that, when run, causes the steps in the first aspect described above or any one of possible implementations of the first aspect to be performed.

For a description of the effects of the above search term recommendation apparatus, computer device, and computer-readable storage medium, reference may be made to the description of the above search term recommendation method, and details are not described herein again.

In order to make the above objectives, features and advantages of the present disclosure more apparent and understandable, a detailed description is provided below with reference to the preferred embodiments and in conjunction with the accompanying drawings.

BRIEF DESCRIPTION OF DRAWINGS

In order to more clearly illustrate the technical solutions in the embodiments of the present disclosure, the accompanying drawings to be used in the embodiments will be briefly described below. The accompanying drawings herein, which are incorporated into and form a part of the description, illustrate the embodiments in line with the present disclosure and are used in conjunction with the description to illustrate the technical solutions of the present disclosure. It should be understood that the accompanying drawings below illustrate merely some embodiments of the present disclosure, and therefore should not be considered as a limitation on the scope. A person of ordinary skill in the art may also obtain other related accompanying drawings from these accompanying drawings without involving any creative effort.

DETAILED DESCRIPTION

Figure 1:
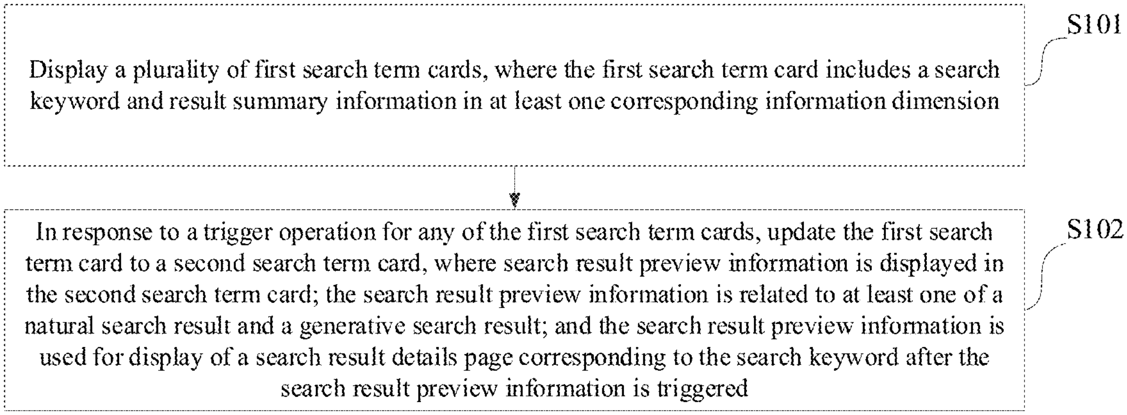
FIG. 1 is a flowchart of a search term recommendation method according to an embodiment of the present disclosure.

In order to make the objectives, technical solutions, and advantages of embodiments of the present disclosure clearer, the technical solutions in the embodiments of the present disclosure will be described clearly and completely below with reference to the accompanying drawings in the embodiments of the present disclosure. Apparently, the described embodiments are merely some, rather than all, of the embodiments of the present disclosure. In general, the components of the embodiments of the present disclosure described and shown herein can be arranged and designed in various configurations. Therefore, the following detailed description of the embodiments of the present disclosure is not intended to limit the scope of protection of the present disclosure, but merely represents selected embodiments of the present disclosure. All other embodiments obtained by a person of skill in the art based on the embodiments of the present disclosure without any creative effort shall fall within the scope of protection of the present disclosure.

In addition, the terms "first", "second", etc. in the embodiments of the present disclosure in the description and claims as well as the above-mentioned accompanying drawings are used to distinguish similar objects, and are not necessarily used to describe a specific order or a precedence order. It should be understood that data termed in such a way may be interchanged where appropriate, so that the embodiments described herein can be implemented in a sequence other than those illustrated or described herein.

As mentioned herein, the terms "a plurality of" or "several" refer to two or more. The term "and/or" describes an association relationship between associated objects, and indicates that three relationships may exist, for example, A and/or B may indicate that: only A exists, both A and B exist, and only B exists. The character "/" generally indicates an "or" relationship between the associated objects.

It has been found from research that when a search term recommendation is made, various search terms are usually displayed in the form of text in a recommendation area of a page, and a user may only determine whether search demands can be met and whether required information can be found based on the displayed text, which often leads to an inaccurate determination. As a result, the user needs to click on a search term and then select a new search term for searching, which is repeated until a desired search result is obtained. In this way, the effect of recommending terms is affected, the information search path and the search time may also be increased, thereby affecting the efficiency of information search and access.

Based on the above research, the present disclosure provides a search term recommendation method and apparatus, a computer device, and a storage medium. Result summary information in at least one information dimension is displayed in a first search term card, and therefore, displaying a plurality of first search term cards makes it possible to use the first search term cards for recommendation of a search keyword and also display of more information related to the search keyword, which enriches the displayed information, and facilitates deciding whether to use the search keyword for searching. In addition, in response to a trigger operation for the first search term card, the first search term card is updated to a second search term card carrying search result preview information, which may allow the search result preview information related to the search keyword to be expanded and displayed without a page jump, and helps a user to browse more extended information related to the search keyword without the page jump, so that screening and filtering of search keywords can be implemented, and a search keyword that meets search demands can be quickly located, thereby helping the user to make a reasonable decision. Moreover, the search result preview information is related to at least one of the natural search result and the generative search result, and therefore, displaying the search result preview information may allow aggregated display of preview information of a plurality of search results, and there is no need for the user to click on a result web page for information access and screening, which shortens the information access path, thereby improving the information access efficiency. Compared with the prior art in which only a search is performed for a recommended term, the search term recommendation method provided in the embodiments of the present disclosure may allow recommendations of the search keyword in two different display states by using the first search term card and the second search term card without the page jump, where in the first display state, the result summary information is displayed, which can help the user to perform preliminary screening of the search keywords, and in the second display state, the search result preview information is displayed, which can help the user to quickly access search result information, and thus to implement secondary screening of the search keywords, thereby accurately determining the search keyword that is needed for use.

The defects that exist in the above solution are all obtained by the inventors through practice and careful research. Therefore, the process of discovering the above problem, and the solutions to the above problem that are provided in the present disclosure hereinafter should all be contributions made by the inventors to the present disclosure in the course of the present disclosure.

It should be noted that similar reference numerals and letters indicate similar items in the accompanying drawings below, and therefore, once an item is defined in one accompanying drawing, it is not necessary to further define and explain the item in subsequent accompanying drawings.

It can be understood that before the use of the technical solutions disclosed in the embodiments of the present disclosure, the user shall be informed of the type, range of use, use scenarios, etc., of personal information involved in the present disclosure in an appropriate manner in accordance with the relevant laws and regulations, and the authorization of the user shall be obtained.

For case of understanding of the present embodiments, the search term recommendation method disclosed in the embodiment of the present disclosure is first described in detail. An execution body of the search term recommendation method provided in the embodiment of the present disclosure is generally a terminal device or another processing device with some computing power, where the terminal device may be a user equipment (UE), a mobile device, a user terminal, a terminal, a personal digital assistant (PDA), a handheld device, a computer device, etc. In some possible implementations, the search term recommendation method may be implemented by a processor by calling computer-readable instructions stored in a memory.

The search term recommendation method provided in the embodiments of the present disclosure is described below by using an example in which the execution body is the computer device.

FIG. 1 is a flowchart of a search term recommendation method according to an embodiment of the present disclosure. The method may include the following steps.

S101: Display a plurality of first search term cards, where the first search term card includes a search keyword and result summary information in at least one corresponding information dimension.

Here, the first search term card is a card for recommendation of the search keyword. In order to improve the recommendation effect, in addition to including the search keyword that needs to be recommended, the first search term card may also have the result summary information for the search keyword in the at least one information dimension displayed therein.

In one information dimension, there is correspondingly one piece of result summary information, which is used to represent core information of the search keyword in the information dimension. The result summary information may be related to a search result for the search keyword in the corresponding information dimension, and/or to information about the search keyword itself in the corresponding information dimension.

The result summary information for the search keyword in the at least one information dimension may be displayed in the first search term card, and a number and type of information dimensions corresponding to result summary information displayed in one first search term card may be determined based on a semantic feature of the search keyword and/or a type of the search keyword. The information dimension may include, for example, a text description dimension, a picture dimension, a table dimension, a video dimension, etc. For the result summary information in the text description dimension, a word count threshold may also be set for the result summary information. Different search keywords may correspond to different information dimensions. For example, for a search keyword of “How many calories are in food XX”, an information dimension corresponding to the search keyword may include the text description dimension, and for example, result summary information in the text description dimension may be “The calories in food XX depend on its size, and the calories in 100 grams of food XX are about 456 kcal”. For another example, for a search keyword of “Latest news of character XX”, an information dimension corresponding to the search keyword may include a news picture dimension, a text description dimension, etc., and for example, result summary information in the text description dimension may be “For latest news of character XX, XXXXXXXXXXX”, and result summary information in the picture dimension may be one or more news pictures. For yet another example, for a search keyword of “Cooking method of food XXX”, an information dimension corresponding to the search keyword may include a video dimension, etc., and for example, result summary information in the video dimension may be one or more result videos.

The result summary information in various information dimensions that is displayed in the first search term card may be used to reflect the core information about the search keyword, and may also provide a summary of the search result related to the search keyword, to indicate that a search result may be found for the search keyword.

The first search term cards corresponding to different search keywords may have different sizes, and a corresponding size of the first search term card may be determined based on the information dimension corresponding to the search keyword and an information amount of the result summary information in each dimension.

The first search term card may be displayed in a recommendation area of any type of page. For example, the first search term card may be displayed in a recommendation area of a main search page, or may be displayed in a recommendation area of a search results page. When displayed in the recommendation area, the first search term cards may be displayed in the form of infinite feed. For example, in response to a swipe operation for the recommendation area, a first search term card currently displayed in the recommendation area may be updated with a new first search term card corresponding to a new recommended search term in infinite feed.

During specific implementation, for any page, when it is determined that a recommendation for the search keyword can be made, first search term cards respectively corresponding to a plurality of search keywords may be displayed in the form of infinite feed in a recommendation area of the page.

Figure 2:
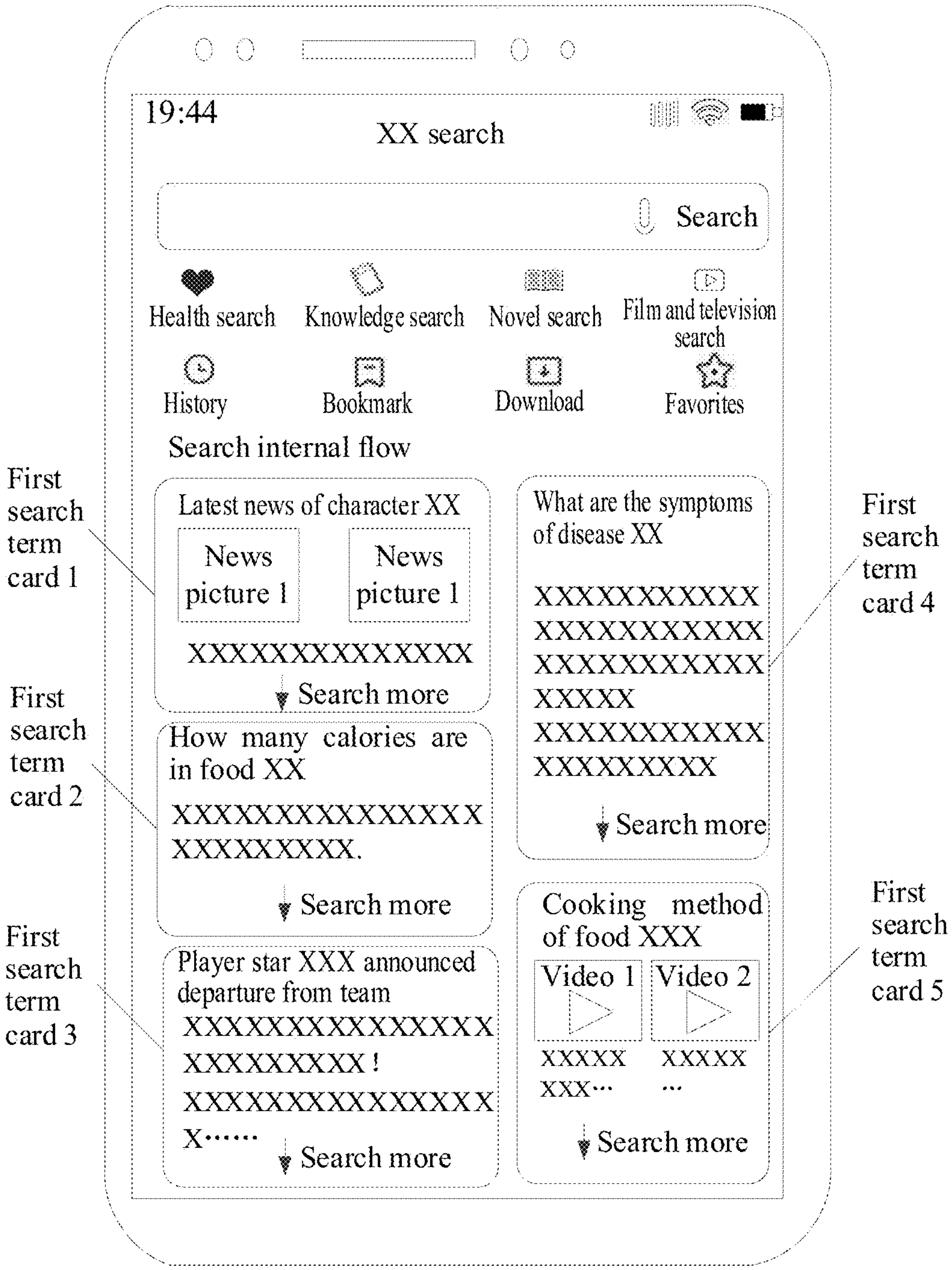
FIG. 2 is a schematic diagram of displaying first search term cards according to an embodiment of the present disclosure.

FIG. 2 is a schematic diagram of displaying first search term cards according to an embodiment of the present disclosure. As shown in FIG. 2, there are a total of 5 first search term cards (i.e., first search term cards 1 to 5), which are displayed in a recommendation area of a main search page, in which page a search box and some function buttons are also displayed. The first search term card 1 corresponds to a search keyword of "Latest news of character XX", and result summary information in a text description dimension and result summary information (i.e., a news picture 1 and a news picture 2) in a picture dimension are displayed in this search term card. The first search term card 2 corresponds to a search keyword of "How many calories are in food XX", and result summary information in the text description dimension is also displayed in this search term card. The first search term card 3 corresponds to a search keyword of "Player star XXX announced departure from team", and result summary information in the text description dimension is also displayed in this search term card. The first search term card 4 corresponds to a search keyword of "What are the symptoms of disease XX", and result summary information in the text description dimension is also displayed in this search term card. The first search term card 5 corresponds to a search keyword of "Cooking method of food XXX", and result summary information (i.e., a video 1 and a video 2) in a video dimension is also displayed in this search term card. In addition, in each of the first search term cards, a trigger button (i.e., a "Search more" button in FIG. 2) may be further displayed. The trigger button is configured to display a second search term card after the trigger button is triggered.

In an embodiment, the plurality of first search term cards may be displayed in a multi-column display style. For example, the plurality of first search term cards may be displayed in the form of infinite feed in a double-column display style, a three-column display style, etc. In FIG. 2, the plurality of first search terms are displayed in a double-column display style.

The information dimension corresponding to the first search term card is related to a semantic feature corresponding to the search keyword, and the information dimension includes at least one of a picture, a video, a text description, and preview indication information.

Here, an information dimension corresponding to a first search term card is a dimension in which core information of the search keyword in the first search term card can be shown. The information dimension may include, but is not limited to, at least one of the picture, the video, the text description, and the preview indication information. Result summary information in the dimension of preview indication information is the preset trigger button, which is configured to display the second search term card including search result preview information after the trigger button is triggered. For example, the result summary information in the dimension of preview indication information may be the "Search more" button in FIG. 2.

During specific implementation, information dimensions corresponding to the search keyword displayed in the first search term card may be determined based on the semantic feature of the search keyword, and then result summary information in each determined information dimension may be generated based on a search result for the search keyword in the information dimension. After the result summary information in each determined information dimension is obtained, the result summary information, the search keyword, and the trigger button may be displayed in the first search term card.

S102: In response to a trigger operation for any one of the first search term cards, update the first search term card to a second search term card, where search result preview information is displayed in the second search term card; the search result preview information is related to at least one of a natural search result and a generative search result; and the search result preview information is used for display of a search result details page corresponding to the search keyword after the search result preview information is triggered.

Here, the trigger operation may be triggering a preset operation for information update and display, for example, triggering a preset gesture. Alternatively, the trigger operation may be an operation of triggering the trigger button in the first search term card, e.g., an operation of clicking on the trigger button.

The second search term card is a search term card related to the triggered first search term card, and the two search term cards correspond to the same search keyword. The search result preview information is displayed in the second search term card for preview of at least one search result related to the search keyword. Compared with the first search term card, the first search term card has richer and more comprehensive information displayed therein, which can better represent the search results that can be found through the search keyword.

The natural search result may be understood as a result that can be directly recalled after a search engine is used to perform a search through the search keyword. The result may be some multimedia information that has already been stored or some web information that already exists. For example, for a search term of "Test video for item XX", if a test video for the item XX that is uploaded by a user has already been stored, the test video may be recalled directly, and then displayed, as the search result preview information, in the second search term card.

The generative search result may include a result that is obtained by further processing the natural search result, a result that is generated for the search keyword by using an artificial intelligence model, and a result that is generated using information, which is related to the search keyword and obtained from an information database. The operation of further processing the natural search result may include making aggregation on, an adjustment to, or a supplement to the natural search result. The preset information database may store a variety of information obtained with authorization, for example, text, a picture, a video, music, a character relationship, a character event, and other information. After the generative search result is obtained, the search result preview information related to the generative search result may be determined based on the result.

The search result details page is a page that displays details information about the search result related to the search result preview information. For example, if the search result preview information is generated based on the natural search result, the search result related to the search result preview information is the natural search result; or if the search result preview information is generated based on the generative search result, the search result related to the search result preview information is the generative search result.

During specific implementation, in response to a click operation on a trigger button in any displayed first search term card, the first search term card may be updated to a second search term card. During the card update process, no page jump is made.

The first search term card may be updated to the second search term card by the following two update methods.

In the first method, the first search term card is replaced with the second search term card.

During specific implementation, in response to the trigger operation, the second search term card may be generated based on the search result preview information, and the generated second search term card may then be used to replace the originally displayed first search term card. The first search term card should have a size consistent with that of the second search term card, so that when the first search term card is replaced with the second search term card, an adaptive position adjustment may be made for other displayed first search term cards.

In the second method, a card size of the first search term card is adjusted based on a display size required for the search result preview information, and the search result preview information is displayed in the adjusted first search term card to obtain the second search term card.

Here, the display size may be determined based on an information amount of the search result preview information, and is used to indicate a size of an area required for the search result preview information on a page.

During specific implementation, in response to the trigger operation, the display size corresponding to the search result preview information may be determined. Then, it is determined whether the display size is consistent with the card size of the first search term card. If the display size is consistent with the card size of the first search term card, the information displayed in the first search term card may be directly replaced with the search result preview information; or if the display size is not consistent with the card size of the first search term card, the card size may be adjusted to the display size to obtain the adjusted first search term card, and then, the search result preview information may be displayed in the adjusted first search term card to implement the update of the first search term card, so as to obtain the second search term card.

Further, after the first search term card is updated to the second search term card, the result details page corresponding to the search keyword may also be displayed in response to a trigger operation for the search result preview information or the second search term card, where the search result related to the search result preview information may be displayed on the result details page. Here, the trigger operation may be an operation of clicking on the search result preview information, or the second search term card, or a trigger button in the second search term card.

Alternatively, after the first search term card is updated to the second search term card, another first search term card may be updated to a corresponding second search term card in response to a trigger operation for the another first search term card.

Figure 3:
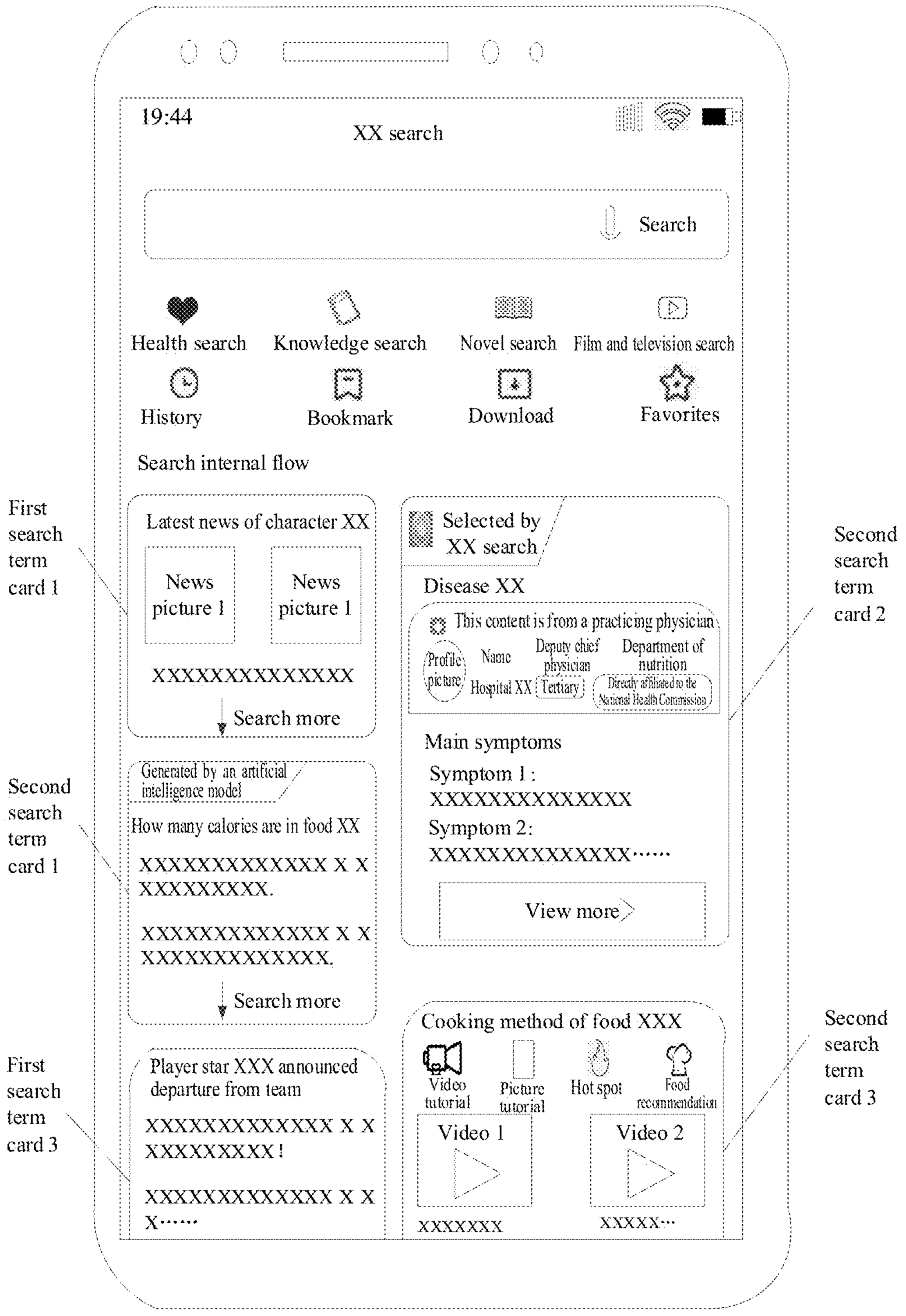
FIG. 3 is a schematic diagram of displaying second search term cards according to an embodiment of the present disclosure.

FIG. 3 is a schematic diagram of displaying second search term cards according to an embodiment of the present disclosure. A page shown in FIG. 3 is a page obtained after each of the first search term cards 2, 4, and 5 on the page shown in FIG. 2 is triggered. In FIG. 3, there are shown the first search term cards 1 and 3, a second search term card 1 corresponding to the first search term card 2, a second search term card 2 corresponding to the first search term card 4, and a second search term card 3 corresponding to the first search term card 5. Search result preview information displayed in the second search term card 1 is richer text description information with a greater number of words than the result summary information in the text description dimension in the corresponding first search term card. Search result preview information displayed in the second search term card 2 is a search result card generated by the artificial intelligence model. Search result preview information displayed in the second search term card 3 includes a plurality of function buttons in different functional dimensions, in addition to the plurality of videos, i.e. the video 1 and the video 2, where different function buttons are configured to obtain search results in different dimensions. There are four function buttons displayed in the second search term card 3, which are a video tutorial button, a picture tutorial button, a hot spot button, and a food recommendation button, respectively. The video tutorial button is configured to, after being triggered, display cooking method videos related to the food XXX. The picture tutorial button is configured to, after being triggered, display a group of cooking method pictures and text related to the food XXX. The food recommendation button is configured to, after being triggered, display a recommended picture and text/video related to the food XXX. The food recommendation button is configured to, after being triggered, display various recommended types of food related to the food XXX. In FIG. 3, a trigger button (i.e., a "View more" button) may be further displayed in each second search term card, and the trigger button is configured to, after being triggered, make a jump to the search result details page.

In an embodiment, if the search result preview information is related to the natural search result, the search result preview information may be determined by:

obtaining, using a search engine, a natural search result matching the search keyword; and determining the search result preview information based on the natural search result if a matching degree between the natural search result and the search keyword meets a preset matching degree.

Here, the preset matching degree may be set empirically, which is not specifically limited in the embodiments of the present disclosure. For example, the preset matching degree may be 90%, 95%, 98%, etc.

During specific implementation, the search engine may be used to determine, based on the semantic feature of the search keyword and resource features of various multimedia resources that may be obtained, a target multimedia resource from among the multimedia resources that matches the search keyword, and then use the target multimedia resource as the natural search result to be recalled. Optionally, the result summary information in the first search term card may also be generated using the natural search result.

After the natural search result is obtained, a preset matching degree algorithm may be used to calculate the matching degree between the natural search result and the search keyword. Then, if it is determined that the matching degree is greater than the preset matching degree, the natural search result may be directly used as the search result preview information, or search result preview information that can represent core content of the natural search result may be generated.

For example, if the natural search result is a video and video introduction information, a cover of the video and summary information corresponding to the video introduction information may be used as the search result preview information. Alternatively, if the natural search result is text content provided by a web page, part of the text content may be used as the search result preview information, or key information may be extracted from the text content and then used as the search result preview information.

In an embodiment, if the search result preview information is related to the generative search result, the search result preview information may be determined by:

obtaining, in response to the search keyword being of a question-answer type, a plurality of natural search results matching the search keyword; and performing result aggregation on the plurality of natural search results to obtain the search result preview information, where the search result preview information includes answer information extracted from the plurality of natural search results.

Here, the search keyword is of the question-answer type, which may indicate that the search keyword is a search question and is used with an intent to obtain an exact answer. For example, the search keyword may be "Will I gain weight from eating food XX?", "Can food XX be eaten raw?", etc. The natural search result is a result that is recalled using the search engine and that matches the search keyword. The answer information is used to indicate an answer related to the question corresponding to the search keyword. In addition to the answer information, the search result preview information may include key information selected from the plurality of natural search results, statistical information for the answer information, etc. The answer statistical information is used to represent proportions of different answers.

During specific implementation, for the search keyword, it is first determined, based on the semantic feature of the search keyword, whether the search keyword is of the question-answer type. If the search keyword is of the question-answer type, the search engine may be used to obtain the plurality of natural search results related to the search keyword. Then, the result aggregation is performed on the plurality of natural search results based on information of each natural search result that is related to the answer corresponding to the search keyword, to obtain the generative search result and the search result preview information corresponding to the result. The search result preview information may include selected answer information, selected key information, answer statistical information, etc. If the search keyword is not of the question-answer type, other methods described hereafter need to be used to generate the search result preview information.

For example, for the search keyword of "Will I gain weight from eating food XX", the search result preview information may include answer information of Yes, answer statistical information indicating that 21% of users considered yes, 66% of the users considered no, and 13% of the users have no idea, and selected key information indicating that the food XXX contains an element XX, which has an efficacy of XX, but excessive consumption may lead to a problem of XXX, and it is the most suitable choice to cook it by means of XX.

In an embodiment, if the search result preview information is related to the generative search result, the search result preview information may be determined by:

in response to the search keyword being of a multi-answer dimension type, obtaining, from a plurality of preset information databases, dimensional information corresponding to the search keyword in each of a plurality of answer dimensions related to the search keyword; and performing structured processing on pieces of dimensional information in the answer dimensions to obtain the search result preview information.

Here, the search keyword is of the multi-answer dimension type, which may indicate that the use of dimensional information in any one of a plurality of answer dimensions as a search result corresponding to the search keyword allows for a match with the search keyword. Different information databases are configured to store different types of information, and the answer dimension may include, but is not limited to, a basic information dimension, an encyclopedia dimension, an event dimension, a character relationship dimension, a film and television work dimension, a musical work dimension, a character experience dimension, etc. The dimensional information is database information in the information database that corresponds to the search keyword in the answer dimension. For example, if the dimensional information indicates the film and television work dimension, the dimensional information may be film and television works related to the search keyword.

The structured processing is implemented by determining a display position of the pieces of dimensional information in the answer dimensions based on a preset information display structure.

During specific implementation, for the search keyword, if it is determined, based on the semantic feature of the search keyword, that the search keyword is of the multi-answer dimension type, the plurality of answer dimensions related to the search keyword may be determined based on the semantic feature. Then, the dimensional information corresponding to each of the plurality of answer dimensions may be obtained from the plurality of preset information databases. Then, the structured processing may be performed on the dimensional information in each of the answer dimensions, to obtain a structured generative search result. Moreover, information extraction may be performed on the generative search result, so that part of the information is extracted in each of the answer dimensions, to obtain the structured search result preview information.

For example, for a search keyword of "Name of character XX", it may be determined that the search keyword is of the multi-answer dimension type. It is assumed that the plurality of determined answer dimensions include the basic information dimension, the encyclopedia dimension, the character relationship dimension, and the film and television work dimension, dimensional information of the character in the above several answer dimensions may be obtained from the plurality of preset information databases, and then, the structured processing may be performed on the dimensional information, to obtain the structured search result preview information.

Optionally, in order to further improve the reasonableness and accuracy of the displayed search result preview information, in the case where the search keyword is of the multi-answer dimension type, after the dimensional information in the plurality of answer dimensions is obtained, if there may be a certain amount of dimensional information in each of the answer dimensions, information aggregation may be first performed on the information in each of the answer dimensions, to obtain aggregated information in the answer dimension. Then, the structured processing may be performed on the aggregated information in each of the answer dimensions, to obtain the structured generative search result and the structured search result preview information.

In an embodiment, if the search result preview information is related to the generative search result, the search result preview information may be determined by:

generating, using an artificial intelligence model, the search result preview information matching the search keyword.

Here, the artificial intelligence model may be a pre-trained neural network model, which has a function of identifying input search information and outputting a corresponding generative search result.

During specific implementation, after the search keyword is obtained, if neither can a corresponding natural search result be found, nor the type of the search keyword can be determined, the search keyword may be input into the artificial intelligence model, and the artificial intelligence model may then be used to perform feature identification on the search keyword, so as to output the corresponding generative search result, and search result preview information corresponding to the generative search result.

Optionally, for any search keyword, if a search card that has a relatively high degree of matching with the search keyword has been maintained in advance, the search card may be directly used as the second search card.

Optionally, before the search result preview information is generated using the artificial intelligence model, if it is determined that the search keyword is of a comprehensive answer type, the search engine may be used to obtain a plurality of natural search results related to the search keyword, and then the artificial intelligence model may be used to aggregate the plurality of natural search results to obtain the generative search result and the search result preview information. The comprehensive answer type is used to indicate that the search keyword is used with an intent to obtain a logical and informative search result.

In an embodiment, the step of displaying the search result details page may be further implemented by the following step:

displaying, on the search result details page, a target search result corresponding to the search result preview information along with additional search results matching the search keyword, where the target search result includes at least one of the natural search result and the generative search result.

Here, the target search result is related to the search result preview information, and if the search result preview information is generated based on the natural search result, the target search result is the natural search result from which the search result preview information is generated; or if the search result preview information is generated based on the generative search result, the target search result is the generative search result from which the search result preview information is generated.

During specific implementation, when the display of the search result details page is triggered, a page jump may be made to the search result details page. The target search result corresponding to the search result preview information, along with additional search results, other than the target search result, that match the search keyword is displayed on the search result details page. The additional search results may be other web pages, other multimedia resources, etc.

Figure 4:
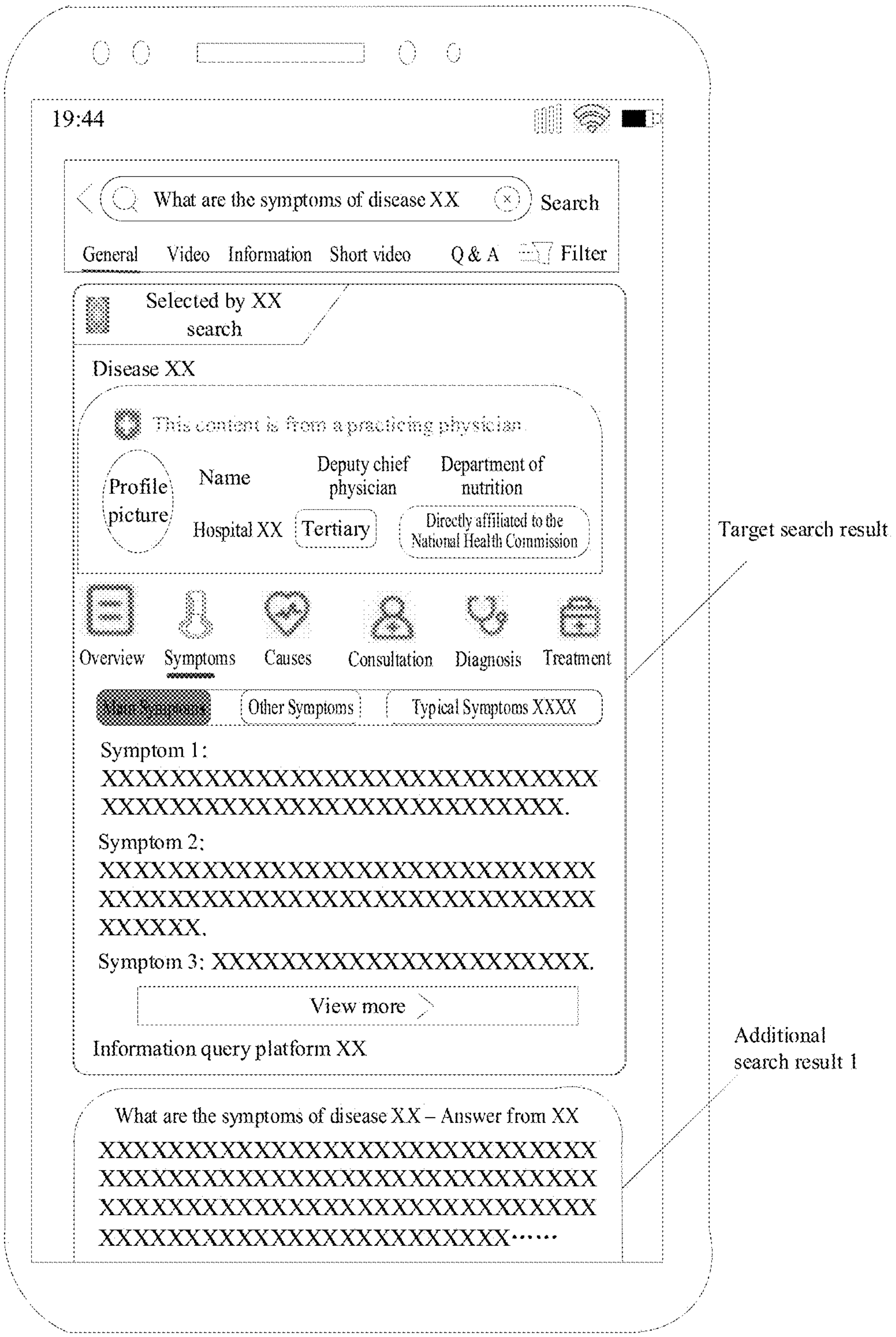
FIG. 4 is a schematic diagram of a search result details page according to an embodiment of the present disclosure.

FIG. 4 is a schematic diagram of a search result details page according to an embodiment of the present disclosure. The search result details page shown in FIG. 4 is generated after the second search term card 2 in FIG. 3 is triggered. A target search result corresponding to the second search term card 2, i.e., a target search result card, and one additional search result (i.e., an additional search result 1 in FIG. 4) are displayed on the search result details page.

Figure 5:
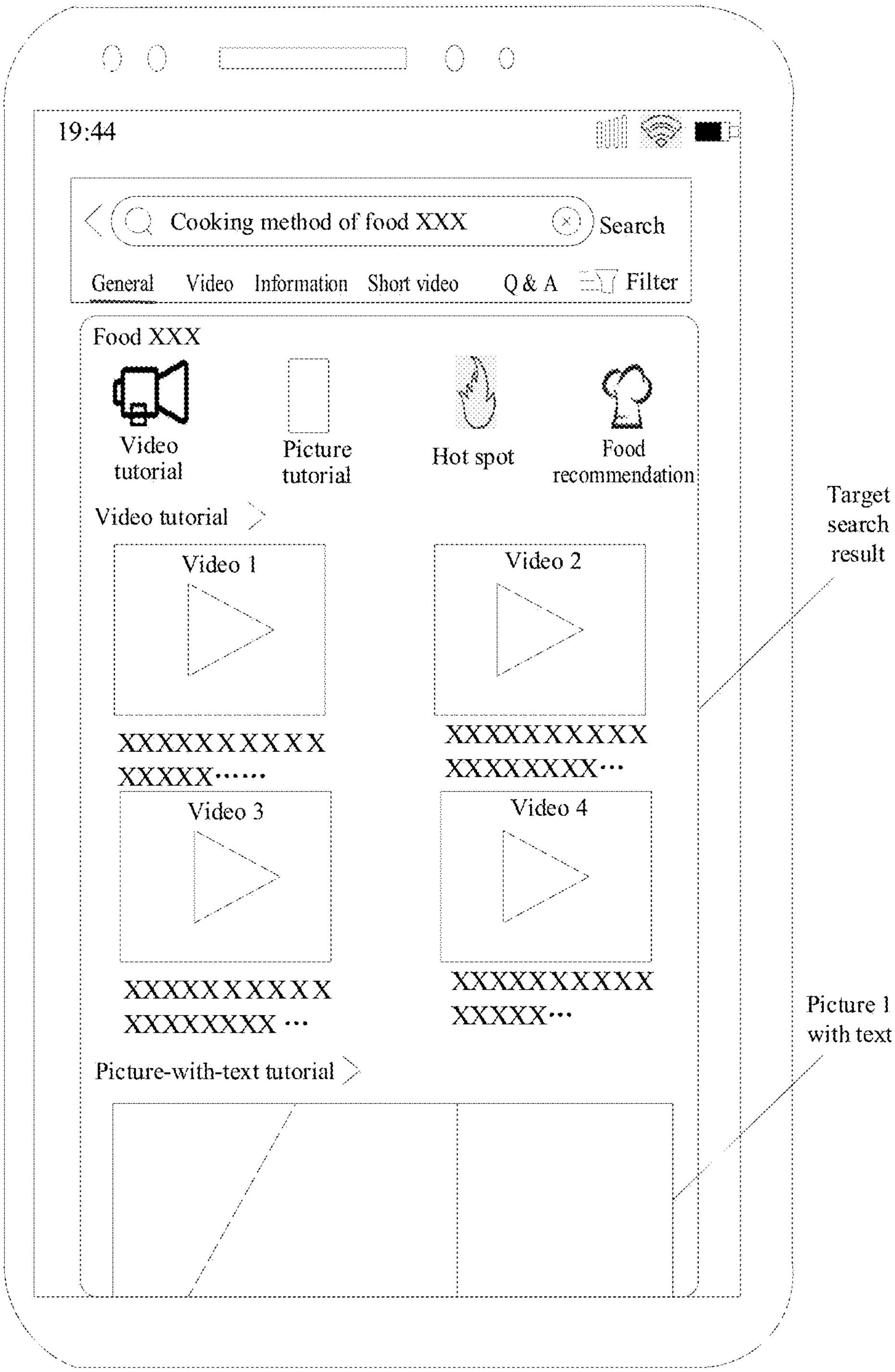
FIG. 5 is a schematic diagram of another search result details page according to an embodiment of the present disclosure.

FIG. 5 is a schematic diagram of another search result details page according to an embodiment of the present disclosure. The search result details page shown in FIG. 5 is generated after the second search term card 3 in FIG. 3 is triggered. Four videos (i.e., videos 1 to 4) under a video tutorial, and one picture with text (i.e., a picture 1 with text) under a picture-with-text tutorial are displayed on the search result details page, where the picture 1 with text is not fully displayed. Due to a relatively large amount of information under each function button, additional search results are not shown in FIG. 5, but in actual applications, the additional search results may be displayed in response to a swipe operation for the page shown in FIG. 5. In this way, the search results that match the search keyword are displayed in an aggregated manner (e.g., divided into videos, pictures with text, recommendations, etc.), such that the richness and diversity of the information displayed on the search result details page can be improved, the time for information access can be reduced, and the path to obtaining a satisfactory result can be shortened.

In a possible implementation, if the search result preview information displayed in the second search term card is obtained by aggregating the plurality of natural search results, the search result details page may display a result website identifier corresponding to each natural search result, a result list identifier, and additional search results, in addition to the target search result corresponding to the search preview information. The result list identifier is used to display natural search results used to generate the target search result after the result list identifier is triggered, and the result website identifier is used to display the natural search results provided at a website corresponding to the identifier after the result website identifier is triggered.

Optionally, in addition to displaying the target search result corresponding to the search preview information, the search result details page may directly display the natural search results used to generate the target search result, along with additional search results other than these natural search results.

Figure 6:
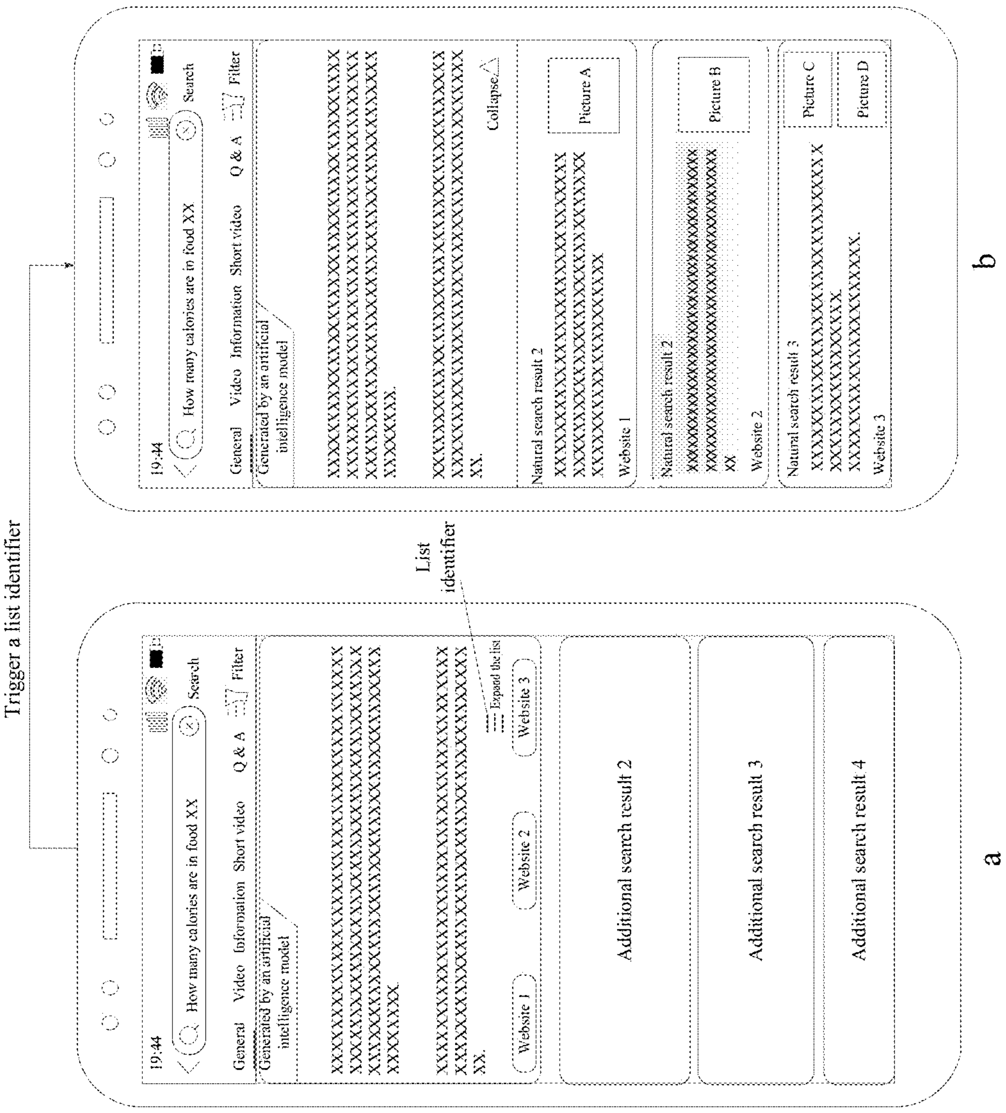
FIG. 6 is a schematic diagram of a jump from a search result details page according to an embodiment of the present disclosure.

FIG. 6 is a schematic diagram of a jump from a search result details page according to an embodiment of the present disclosure. The search result details page shown in a of FIG. 6 is generated after the second search term card 1 in FIG. 3 is triggered. A target search result, additional search results 2 to 4, a list identifier, and three result website identifiers (i.e., websites 1 to 3) are displayed on the search result details page. The four result website identifiers are related to a plurality of natural search results used to generate the search result preview information in the second search term card 1. After the list identifier is trigged by a user, the target search result, and three natural search results (i.e., natural search results 1 to 3) used to generate the search result preview information are displayed, as shown in b of FIG. 6.

In an embodiment, after the search result details page corresponding to the search keyword is displayed, the following operation may be further performed:

- displaying a plurality of third search term cards in a search term recommendation area of the search result details page, where the third search term card includes recommended search terms related to the search keyword, and result summary information for the recommended search terms in at least one corresponding information dimension.

Here, the third search term card is a card for displaying recommended search terms, and the result summary information for the recommended search terms in at least one corresponding information dimension. The recommended search terms are recommended terms related to the search keyword corresponding to the search result details page.

During specific implementation, after the search result details page is displayed, if it is determined that a search term recommendation may be made on the search result details page, result summary information corresponding to the recommended search terms related to the search keyword may be obtained, and the third search term card corresponding to the plurality of recommended search terms may be displayed in the form of infinite feed in the search term recommendation area of the search result details page. In this way, the recommendation and display of a new recommended term may be implemented in the form of an infinite feed card on the search result details page.

A person skilled in the art can understand that in the above methods of the specific implementations, the order in which the steps are written does not imply a strict order of execution, and does not constitute any limitation on the implementation process. Instead, the specific order of execution of the steps should be determined by their functions and possible internal logic.

Based on the same inventive concept, an embodiment of the present disclosure further provides a search term recommendation apparatus corresponding to the search term recommendation method. The principle of the apparatus solution in the embodiment of the present disclosure is similar to that of the above search term recommendation method in the embodiment of the present disclosure. Therefore, for the implementation of the apparatus, reference may be made to that of the method, and the repetitions are not described in detail again.

Figure 7:
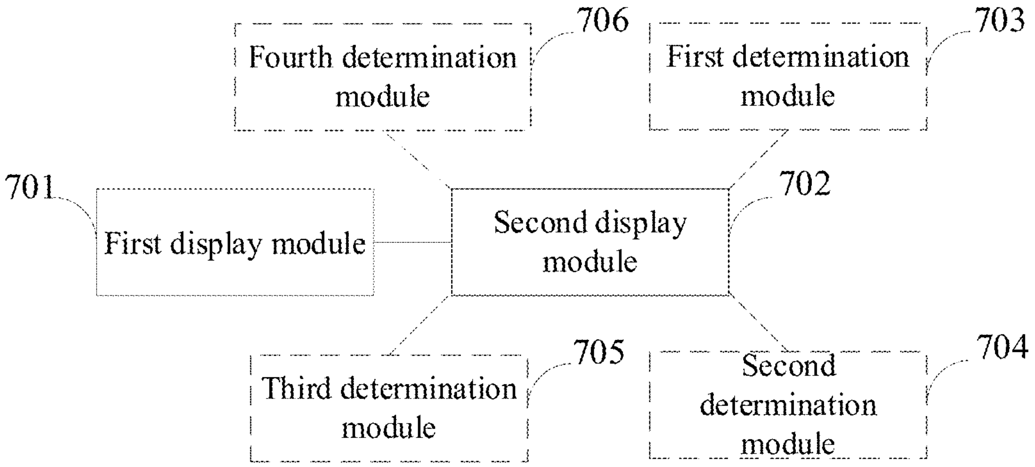
FIG. 7 is a schematic diagram of a search term recommendation apparatus according to an embodiment of the present disclosure.

FIG. 7 is a schematic diagram of a search term recommendation apparatus according to an embodiment of the present disclosure. The apparatus includes:

- a first display module 701 configured to display a plurality of first search term cards, where the first search term card includes a search keyword and result summary information in at least one corresponding information dimension; and
- a second display module 702 configured to, in response to a trigger operation for any one of the first search term cards, update the first search term card to a second search term card, where search result preview information is displayed in the second search term card; the search result preview information is related to at least one of a natural search result and a generative search result; and
- the search result preview information is used for display of a search result details page corresponding to the search keyword after the search result preview information is triggered.

In a possible implementation, when updating the first search term card to the second search term card, the second display module 702 is configured to:

- replace the first search term card with the second search term card.

In a possible implementation, when updating the first search term card to the second search term card, the second display module 702 is configured to:

- adjust a card size of the first search term card based on a display size required for the search result preview information, and display the search result preview information in the adjusted first search term card to obtain the second search term card.

In a possible implementation, the plurality of first search term cards are in a multi-column display style; and

- the information dimension corresponding to the first search term card is related to a semantic feature corresponding to the search keyword, and the information dimension includes at least one of a picture, a video, a text description, and preview indication information.

In a possible implementation, the apparatus further includes:

- a first determination module 703 configured to determine the search result preview information by:
- obtaining, using a search engine, a natural search result matching the search keyword; and
- determining the search result preview information based on the natural search result if a matching degree between the natural search result and the search keyword meets a preset matching degree.

In a possible implementation, the apparatus further includes:

- a second determination module 704 configured to determine the search result preview information by:
- obtaining, in response to the search keyword being of a question-answer type, a plurality of natural search results matching the search keyword; and
- performing result aggregation on the plurality of natural search results to obtain the search result preview information, where the search result preview information includes answer information extracted from the plurality of natural search results.

In a possible implementation, the apparatus further includes:

- a third determination module 705 configured to determine the search result preview information by:
- in response to the search keyword being of a multi-answer dimension type, obtaining, from a plurality of preset information databases, dimensional information corresponding to the search keyword in each of a plurality of answer dimensions related to the search keyword; and
- performing structured processing on pieces of dimensional information in the answer dimensions to obtain the search result preview information.

In a possible implementation, the apparatus further includes:

- a fourth determination module 706 configured to determine the search result preview information by:

generating, using an artificial intelligence model, the search result preview information matching the search keyword.

In a possible implementation, when displaying the search result details page corresponding to the search keyword, the second display module 702 is configured to:

display, on the search result details page, a target search result corresponding to the search result preview information along with additional search results matching the search keyword, where the target search result includes at least one of the natural search result and the generative search result.

In a possible implementation, after displaying the search result details page corresponding to the search keyword, the second display module 702 is further configured to:

display a plurality of third search term cards in a search term recommendation area of the search result details page, where the third search term card includes recommended search terms related to the search keyword, and result summary information for the recommended search terms in at least one corresponding information dimension.

For the descriptions of the processing flows of various modules in the apparatus, and the interaction flow between the modules, reference may be made to the related descriptions in the above method embodiments, and details are not described herein again.

Figure 8:
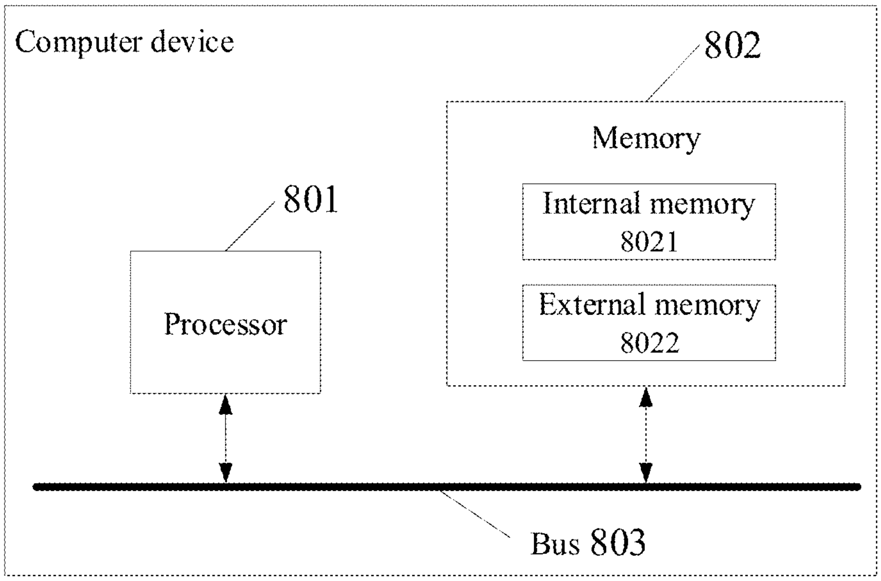
FIG. 8 is a schematic diagram of a structure of a computer device according to an embodiment of the present disclosure.

Based on the same technical concept, an embodiment of the present application further provides a computer device. FIG. 8 is a schematic diagram of a structure of a computer device according to an embodiment of the present application. The computer device includes:

a processor 801, a memory 802, and a bus 803. The memory 802 stores machine-readable instructions executable by the processor 801, the processor 801 is configured to execute the machine-readable instructions stored in the memory 802, and the machine-readable instructions, when executed by the processor 801, cause the processor 801 to: S101: display a plurality of first search term cards, where the first search term card includes a search keyword and result summary information in at least one corresponding information dimension; and S102: in response to a trigger operation for any one of the first search term cards, update the first search term card to a second search term card, where search result preview information is displayed in the second search term card; the search result preview information is related to at least one of a natural search result and a generative search result; and the search result preview information is used for display of a search result details page corresponding to the search keyword after the search result preview information is triggered.

The above memory 802 includes an internal memory 8021 and an external memory 8022. The internal memory 8021 here is also called a built-in memory, which is configured to temporarily store operation data of the processor 801, and the data exchanged with the external memory 8022 such as a hard disk. The processor 801 exchanges data with the external memory 8022 through the internal memory 8021. When the computer device is running, the processor 801 communicates with the memory 802 through the bus 803, so that the processor 801 executes the execution instructions mentioned in the above method embodiment.

An embodiment of the present disclosure further provides a computer-readable storage medium having stored thereon a computer program that, when executed by a processor, causes the steps of the search term recommendation method in the above method embodiment to be performed. The storage medium may be a volatile or non-volatile computer-readable storage medium.

An embodiment of the present disclosure provides a computer program product for the search term recommendation method. The computer program product includes a computer-readable storage medium storing program code, where instructions included in the program code can be used to perform the steps of the search term recommendation method described in the above method embodiment. For details, reference may be made to the above method embodiment, and the details are not described herein again.

The computer program product may specifically be implemented in the form of hardware, software or a combination thereof. In an optional embodiment, the computer program product is specifically embodied as a computer storage medium. In another optional embodiment, the computer program product is specifically embodied as a software product, such as a software development kit (SDK).

It can be clearly understood by a person skilled in the art that, for convenience and brevity of description, for the specific operation processes of the apparatus described above, reference may be made to the corresponding processes in the foregoing method embodiment, and details are not described herein again. In the several embodiments provided in the present disclosure, it should be understood that the disclosed apparatus and method may be implemented in other manners. The described apparatus embodiment is merely an example. For example, the division of units is merely a logical function division, and may be other division methods during actual implementation. For another example, a plurality of units or components may be combined, or some features may be omitted or not performed. In addition, the mutual couplings, direct couplings, or communication connections shown or discussed may be implemented through some communication interfaces. The indirect couplings or communication connections between the apparatuses or units may be implemented in electrical, mechanical, or other forms.

The units described as separate parts may or may not be physically separate, and parts shown as units may or may not be physical units, and may be located at one position, or may be distributed on a plurality of network units. Some or all of the units may be selected according to actual needs to achieve the objectives of the solutions of the embodiments.

In addition, functional units in the embodiments of the present disclosure may be integrated into one processing unit, each of the units may exist alone physically, or two or more units may be integrated into one unit.

The functions may be stored in a processor-executable, non-volatile computer-readable storage medium if implemented in the form of a software functional unit and sold or used as an independent product. Based on such understanding, the technical solution of the present disclosure, in essence, or its contribution to the prior art, or part of the technical solution may be embodied in the form of a software product. The computer software product is stored in a storage medium, and includes several instructions used to cause a computer device (which may be a personal computer, a server, or a network device, etc.) to perform all or some of the steps of the method in various embodiments of the present disclosure. Moreover, the foregoing storage medium includes a USB flash disk, a removable hard disk, a read-only memory (ROM), a random-access memory (RAM), a magnetic disc, or an optical disc, or other various media that can store program code.

If the technical solutions of the present application involve personal information, before the information of an individual is processed by a product in which the technical solutions of the present application are applied, an individual has been clearly informed of rules for personal information processing, and the voluntary consent has been obtained from the individual. If the technical solutions of the present application involve sensitive personal information, before the sensitive information of an individual is processed by a product in which the technical solutions of the present application are applied, the separate consent has been obtained from the individual, and the requirement of "explicit consent" has also been met. For example, an explicit and prominent sign is set at a personal information collection apparatus such as a camera, to inform that a personal information collection region has been entered for collection of the personal information, and any individual who voluntarily enters the collection region is deemed to have consented to the collection of personal information thereof. Alternatively, on an apparatus for personal information processing, after a clear sign/message is used to inform of the rules for personal information processing, authorization is obtained from the individual by means of a pop-up message or by asking the individual to upload personal information on their own. The rules for personal information processing may include information such as a personal information processor, a purpose and means of personal information processing, and a category of processed personal information.

Finally, it should be noted that the above embodiments are merely specific implementations of the present disclosure for illustrating, rather than limiting, the technical solutions of the present disclosure, and the scope of protection of the present disclosure is not defined thereto. Although the present disclosure is illustrated in detail with reference to the foregoing embodiments, those of ordinary skill in the art should understand that, within the technical scope disclosed by the present disclosure, any person skilled in the art could still modify the technical solutions described in the foregoing embodiments or readily conceive of the change, or perform equivalent replacements for some of the technical features. These modifications, changes or replacements do not make the essence of the corresponding technical solutions depart from the spirit and scope of the technical solutions of the embodiments of the present disclosure, and should be encompassed within the scope of protection of the present disclosure. Therefore, the scope of protection of the present disclosure shall be subject to the scope of protection of the claims.

The invention claimed is:

1. A search term recommendation method, comprising:

displaying a plurality of first search term cards in a first page, wherein the first search term card comprises a search keyword and result summary information in at least one corresponding information dimension; and in response to a trigger operation for any one of the first search term cards, updating the first search term card to a second search term card, wherein search result preview information is displayed in the second search term card, the search result preview information is related to at least one of a natural search result and a generative search result, and non-updated first search term cards among the plurality of first search term cards and the second search term card are all displayed in the first page;

after the search result preview information is triggered, a page jump is made to display a search result details page corresponding to the search keyword from the first page;

wherein the method further comprises: after the search result details page corresponding to the search keyword is displayed, displaying a plurality of third search term cards in a search term recommendation area of the search result details page, wherein the third search term card comprises recommended search terms related to the search keyword, and result summary information for the recommended search terms in at least one corresponding information dimension.

2. The method according to claim 1, wherein the updating the first search term card to a second search term card comprises:

replacing the first search term card with the second search term card.

3. The method according to claim 1, wherein the updating the first search term card to a second search term card comprises:

adjusting a card size of the first search term card based on a display size required for the search result preview information, and displaying the search result preview information in the adjusted first search term card to obtain the second search term card.

4. The method according to claim 1, wherein the plurality of first search term cards are in a multi-column display style; and the information dimension corresponding to the first search term card is related to a semantic feature corresponding to the search keyword, and the information dimension comprises at least one of a picture, a video, a text description, and preview indication information.

5. The method according to claim 1, wherein the search result preview information is determined by:

obtaining, using a search engine, a natural search result matching the search keyword; and determining the search result preview information based on the natural search result in response to a matching degree between the natural search result and the search keyword meeting a preset matching degree.

6. The method according to claim 1, wherein the search result preview information is determined by:

obtaining, in response to the search keyword being of a question-answer type, a plurality of natural search results matching the search keyword; and performing result aggregation on the plurality of natural search results to obtain the search result preview information, wherein the search result preview information comprises answer information extracted from the plurality of natural search results.

7. The method according to claim 1, wherein the search result preview information is determined by:

in response to the search keyword being of a multi-answer dimension type, obtaining, from a plurality of preset information databases, dimensional information corresponding to the search keyword in each of a plurality of answer dimensions related to the search keyword; and performing structured processing on pieces of dimensional information in the answer dimensions to obtain the search result preview information.

8. The method according to claim 1, wherein the search result preview information is determined by:

generating, using an artificial intelligence model, the search result preview information matching the search keyword.

9. The method according to claim 1, wherein the display of the search result details page corresponding to the search keyword comprises:

displaying, on the search result details page, a target search result corresponding to the search result preview information along with additional search results matching the search keyword, wherein the target search result comprises at least one of the natural search result and the generative search result.

10. A computer device, comprising: a processor and a memory, wherein the memory stores machine-readable instructions executable by the processor, the processor is configured to execute the machine-readable instructions stored in the memory, and the machine-readable instructions, when executed by the processor, cause the processor to perform a search term recommendation method, which comprises:

displaying a plurality of first search term cards in a first page, wherein the first search term card comprises a search keyword and result summary information in at least one corresponding information dimension; and in response to a trigger operation for any one of the first search term cards, updating the first search term card to a second search term card, wherein search result preview information is displayed in the second search term card, the search result preview information is related to at least one of a natural search result and a generative search result, and non-updated first search term cards among the plurality of first search term cards and the second search term card are all displayed in the first page;

after the search result preview information is triggered, a page jump is made to display a search result details page corresponding to the search keyword from the first page;

wherein the method further comprises: after the search result details page corresponding to the search keyword is displayed, displaying a plurality of third search term cards in a search term recommendation area of the search result details page, wherein the third search term card comprises recommended search terms related to the search keyword, and result summary information for the recommended search terms in at least one corresponding information dimension.

11. The computer device according to claim 10, wherein the updating the first search term card to a second search term card comprises:

replacing the first search term card with the second search term card.

12. The computer device according to claim 10, wherein the updating the first search term card to a second search term card comprises:

adjusting a card size of the first search term card based on a display size required for the search result preview information, and displaying the search result preview information in the adjusted first search term card to obtain the second search term card.

13. The computer device according to claim 10, wherein the plurality of first search term cards are in a multi-column display style; and the information dimension corresponding to the first search term card is related to a semantic feature corresponding to the search keyword, and the information dimension comprises at least one of a picture, a video, a text description, and preview indication information.

14. The computer device according to claim 10, wherein the search result preview information is determined by:

obtaining, using a search engine, a natural search result matching the search keyword; and determining the search result preview information based on the natural search result in response to a matching degree between the natural search result and the search keyword meeting a preset matching degree.

15. The computer device according to claim 10, wherein the search result preview information is determined by:

obtaining, in response to the search keyword being of a question-answer type, a plurality of natural search results matching the search keyword; and performing result aggregation on the plurality of natural search results to obtain the search result preview information, wherein the search result preview information comprises answer information extracted from the plurality of natural search results.

16. The computer device according to claim 10, wherein the search result preview information is determined by:

in response to the search keyword being of a multi-answer dimension type, obtaining, from a plurality of preset information databases, dimensional information corresponding to the search keyword in each of a plurality of answer dimensions related to the search keyword; and performing structured processing on pieces of dimensional information in the answer dimensions to obtain the search result preview information.

17. The computer device according to claim 10, wherein the search result preview information is determined by:

generating, using an artificial intelligence model, the search result preview information matching the search keyword.

18. The computer device according to claim 10, wherein the display of the search result details page corresponding to the search keyword comprises:

displaying, on the search result details page, a target search result corresponding to the search result preview information along with additional search results matching the search keyword, wherein the target search result comprises at least one of the natural search result and the generative search result.

19. A non-transitory computer-readable storage medium, having stored thereon a computer program that, when run by a computer device, causes the computer device to perform a search term recommendation method, which comprises:

displaying a plurality of first search term cards in a first page, wherein the first search term card comprises a search keyword and result summary information in at least one corresponding information dimension; and in response to a trigger operation for any one of the first search term cards, updating the first search term card to a second search term card, wherein search result preview information is displayed in the second search term card, the search result preview information is related to at least one of a natural search result and a generative search result, and non-updated first search term cards among the plurality of first search term cards and the second search term card are all displayed in the first page;

after the search result preview information is triggered, a page jump is made to display a search result details page corresponding to the search keyword from the first page;

wherein the method further comprises: after the search result details page corresponding to the search keyword is displayed, displaying a plurality of third search term cards in a search term recommendation area of the search result details page, wherein the third search term card comprises recommended search terms related to the search keyword, and result summary information for the recommended search terms in at least one corresponding information dimension.

* * * * *